United States Patent [19]
DelBeke

[11] Patent Number: 5,310,211
[45] Date of Patent: May 10, 1994

[54] HOLLOW UPPER CONTROL ARM FOR VEHICLE SUSPENSION SYSTEMS

[75] Inventor: Robert G. DelBeke, Livonia, Mich.

[73] Assignee: MascoTech, Inc., Novi, Mich.

[21] Appl. No.: 32,480

[22] Filed: Mar. 16, 1993

Related U.S. Application Data

[63] Continuation of Ser. No. 805,609, Dec. 10, 1991, abandoned.

[51] Int. Cl.$^5$ .............................................. B60G 7/00
[52] U.S. Cl. .................................... 280/673; 280/690; 280/691
[58] Field of Search ............... 280/673, 675, 663, 690, 280/691, 688; 267/228; 52/731; 29/897.2

[56] References Cited

U.S. PATENT DOCUMENTS

| | | | |
|---|---|---|---|
| 1,399,201 | 12/1921 | Fekete | 280/798 |
| 1,656,810 | 1/1928 | Arnstein | 52/731 |
| 1,882,484 | 10/1932 | Carpenter | 280/691 |
| 2,127,618 | 8/1938 | Riemenschneider | |
| 2,280,016 | 4/1942 | Werdehoff | |
| 2,556,767 | 6/1951 | McCann | 280/691 |
| 2,640,737 | 6/1953 | Reifsnyder | |
| 2,784,983 | 3/1957 | Dean | |
| 2,827,303 | 3/1958 | Herbenar | 280/673 |
| 3,088,749 | 5/1963 | Schilberg | 52/731 |
| 3,209,432 | 10/1965 | Cape | |
| 3,314,673 | 4/1967 | Graney et al. | |
| 3,411,803 | 11/1968 | Melton et al. | |
| 4,016,950 | 4/1977 | Allison | |
| 4,192,396 | 3/1980 | Austermann, Jr. et al. | |
| 4,732,819 | 3/1988 | Komuro | |
| 4,967,473 | 11/1990 | Wessel | |

FOREIGN PATENT DOCUMENTS

| | | | |
|---|---|---|---|
| 219563 | 3/1958 | Australia | 280/663 |
| 1171278 | 5/1964 | Fed. Rep. of Germany | 280/691 |
| 1921390 | 11/1970 | Fed. Rep. of Germany | 52/731 |
| 2395161 | 2/1979 | France | 280/690 |
| 67507 | 4/1983 | Japan | 280/688 |

*Primary Examiner*—Karin L. Tyson
*Attorney, Agent, or Firm*—Edgar A. Zarins; Malcolm L. Sutherland

[57] ABSTRACT

An upper control arm for a vehicle suspension system having a modulus section of hollow construction for reduced weight. The modulus section of the control arm is of a stamped and welded construction thereby eliminating material weight while reducing the cost of manufacturing. The modulus section has a substantially triangular configuration with a reinforced rim flange along the high compression stress area of the control arm elbow. The reinforced rim flange improves the strength of the control arm without sacrificing the weight reduction provided by the hollow construction.

7 Claims, 1 Drawing Sheet

HOLLOW UPPER CONTROL ARM FOR VEHICLE SUSPENSION SYSTEMS

This is a continuation of copending application(s) Ser. No. 07/805,609 filed on Dec. 10, 1991 now abandoned.

BACKGROUND OF THE INVENTION

I. Field of the Invention

This invention relates to an upper control arm for a vehicle suspension system and, in particular, to a control arm having a modulus section of hollow construction with an enlarged rim flange for reinforcement of high load stress areas of the control arm.

II. Description of the Prior Art

Upper control arms are routinely incorporated into the suspension systems of truck and passenger vehicles. The typical control arm is generally U-shaped with a ball joint assembly at the apex of the control arm and pivot bar bushings at the ends of the arm for mounting the control arm to a pivot bar assembly. In the past, the modulus sections between the bushings and the ball joint have been solid sections of cast iron or cast aluminum. It was believed that the traditional cast metal sections were necessary to maintain the integrity of the control arm under the stresses of the suspension system. More recently, the modulus section has been constructed of a steel forging of wire frame design. Although these control arm constructions were strong enough to withstand the stress loads they also were very heavy. In today's vehicle market every aspect of a vehicle is examined for weight reduction.

Recent proposals for reducing the weight of the suspension system include a hollow, two-piece control arm. The square hollow bar section comprises a pair of U-shaped components nested together and double seam welded. Thus, the control arm has double side walls with single upper and lower walls. Although strong and lightweight, the double side walls are not located at the compressive stress areas of the arm where additional strength is required. Moreover, the double seam construction requires precise welding over a curving contour which has not been easy to accommodate. Nevertheless, substantial weight reduction over the solid cross-section of the prior known control arms has been accomplished.

SUMMARY OF THE PRESENT INVENTION

The present invention overcomes the disadvantages of the prior known control arms for vehicle suspension systems by incorporating a modulus section of hollow construction having a substantially triangular configuration in order to distribute the compressive stress loads associated with the suspension system. An enlarged rim flange at the joint apex of the stamped triangular construction provides improved reinforcement at the high compression stress areas of modulus section.

Typical of control arms, the present invention has a substantially U-shaped configuration with a ball joint assembly at the apex and pivot bar bushings at the ends of the control arm. However, the control arm of the present invention includes a modulus section having a substantially triangular hollow crosssection which reduces the overall weight of the control arm while maintaining strength in key stress areas of the elbow sections. The hollow triangular sections are formed through a stamping process wherein the upper apex of the modulus section incorporates a seam weld to form the triangular cross-section. For increased stiffening and reinforcement, an enlarged rim flange is formed along the welded apex seam. This rim flange along the high compression stress area of the control arm elbow eliminates stress failures along this area and permits double plate FEA modeling resulting in additional load balancing capabilities.

Other objects, features and advantages of the invention will be apparent from the following detailed description taken in connection with the accompanying drawings.

BRIEF DESCRIPTION OF THE DRAWINGS

The present invention will be more fully understood by reference to the following detailed description of a preferred embodiment of the present invention when read in conjunction with the accompanying drawing, in which like reference characters refer to like parts throughout the views and in which.

DETAILED DESCRIPTION OF A PREFERRED EMBODIMENT OF THE PRESENT INVENTION

Figure 1:
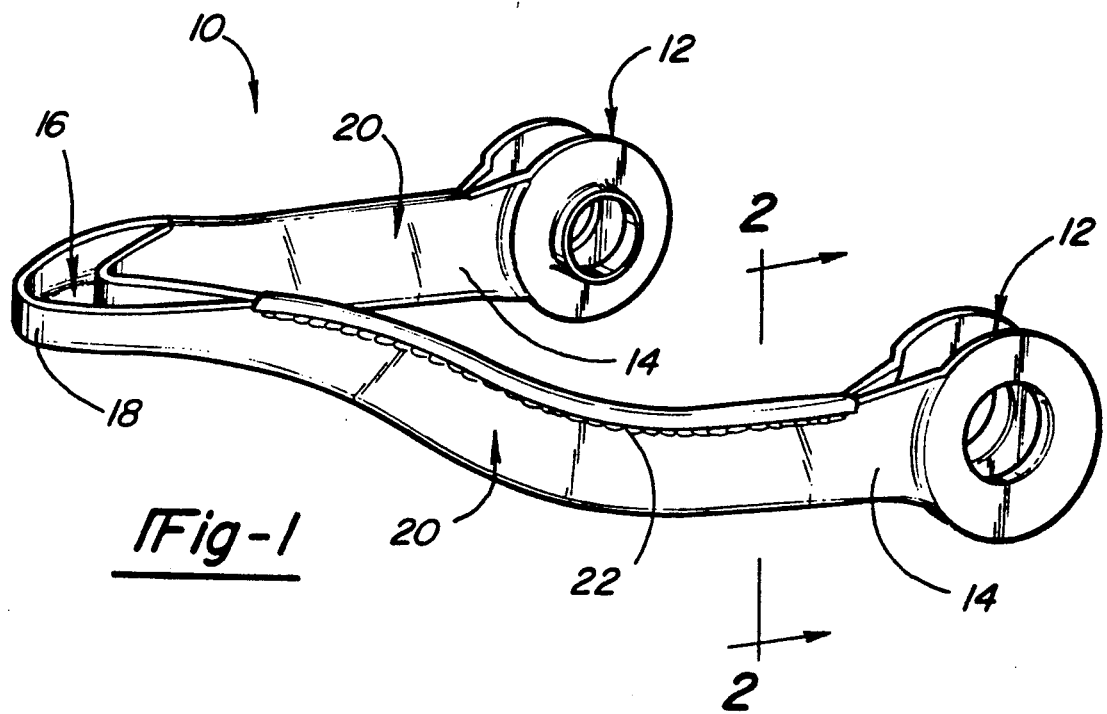
FIG. 1 is an elevated perspective view of a upper control arm for a vehicle suspension system embodying the present invention.
Figure 2:
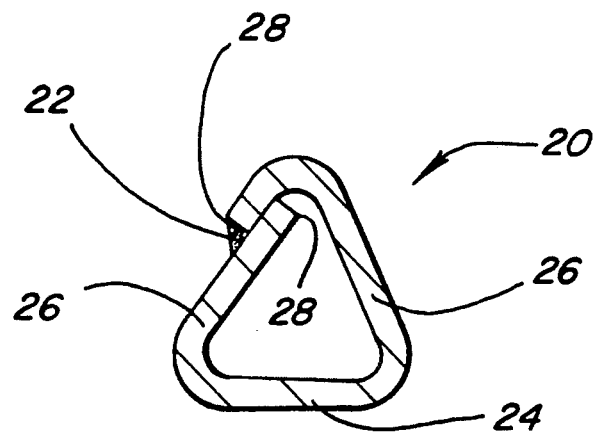
FIG. 2 is a cross-sectional view of the control arm taken along lines 2—2 of FIG. 1.

Referring to FIGS. 1 and 2, there is shown elevational and cross-sectional views of a control arm 10 embodying the principles of the present invention. The control arm 10 is preferably an upper control arm forming a part of a suspension system of a vehicle. As is typical of such components, the control arm 10 has a substantially U-shaped configuration with bushing apertures 12 formed at the ends of the arms 14 and a ball joint receptacle 16 formed at the apex 18 of the control arm 10. The ball joint receptacle 16 is adapted to cooperate with a ball joint assembly (not shown) and may include a ball joint housing integrally formed with the control arm 10. Typical modern control arms 10 incorporate a separate ball joint housing which is inserted into the apex 18 of the control arm 10. The bushing apertures 12 are designed to retain pipe bushings (not shown) for mating engagement with a pivot bar assembly forming a portion of the vehicle suspension system. The pivot bar typically extends through both bushing apertures 12 allowing the control arm 10 to pivot about the assembly in response to road conditions affecting the vehicle suspension system.

The control arm 10 of the present invention is formed of an integral metal stamping to ensure the required structural strength for the suspension system. However, unlike the prior known control arms which incorporate a solid construction, the present invention comprises hollow modulus sections 20 for weight reduction. The control arm 10 includes modulus sections 20 along each arm 14 between the apex 18 and the bushing apertures 12. Because of design considerations, the arms 14 are curved so as to extend between the ball joint and the pivot bar. In order to extend therebetween, the arms incorporate a compound curvature to extend across and downward. These modulus sections 20 are subject to extreme compression and tension loads and therefore must have sufficient structural strength to withstand such loads. In order to maintain the structural strength while providing substantial weight reduction, the modulus sections 20 of the control arm 10 of the present invention are provided with a hollow, substantially triangular cross-sectional configuration as best shown in FIG. 2. It has been found that this triangular configuration provides improved strength against the loads while also providing a uniform weld line over the contours of the modulus sections 20 facilitating programmable welding of the seam 22 along the modulus sections 20.

The triangular modulus section 20 of the control arm 10 includes a bottom wall 24 and a pair of side walls 26. The triangular modulus section 20 is formed such that one of the side walls 24 includes an extension 28 bent to overlap the other side wall 24 forming the overlap seam 22 along the side wall 24. This triangular cross-sectional construction provides a balanced configuration capable of withstanding the stress loads associated with the suspension system. The modulus section 20 and the control arm 10 are stamped as an integral body. The modulus section 20 includes an elongated section with opposing side edges 28. The elongated modulus section is bent along substantially parallel lines such that one of the side edges 28 overlaps the other side edge 28. Once the overlap seam 22 is formed, the control arm 10 may be passed through a welder to weld the seam 22. The stamping is bent to form the triangular modulus section such that the seam is formed at precisely the identical cross-sectional location for various control arm configurations thereby providing a uniform weld pattern facilitating robotic welding. Thus, despite variations in the overall configuration of the control arm 10 the weld pattern for the seam 22 will remain constant thereby reducing manufacturing costs.

The foregoing detailed description has been given for clearness of understanding only and no unnecessary limitations should be understood therefrom as some modifications will be obvious to those skilled in the art without departing from the scope and spirit of the appended claims.

What is claimed is:

1. A control arm for a vehicle suspension system adapted to be connected to a ball joint assembly and a pivot bar assembly, said control arm comprising:

an integral body having a substantially U-shaped configuration with a bottom wall and a pair of integral side walls extending upwardly from said bottom wall, means for receiving the ball joint assembly mounted within said bottom wall at a bight of said body and means for receiving the pivot bar assembly at remote ends of said body;

said integral body having modulus sections along a substantial part of the length of each arm extending from said bight of said body, said bight having a U-shaped cross-sectional configuration with said side walls extending upwardly from said bottom wall and said modulus sections having a hollow, substantially triangular cross-sectional configuration formed of an integral one-piece stamping and including a compound curve along said modulus sections, said triangular modulus sections having a seam proximate an apex of said triangular modulus sections formed along one wall thereof by overlapping one of said side walls over the other of said side walls of said stamping, said overlap seam proximate said modulus section apex forming a predetermined pattern along the compound curve of said modulus section facilitating welding of said seam with a single pass weld pattern for different control arm configurations, said seam on different control arm configurations having substantially identical patterns allowing welding of identical cross-sectional locations along said modulus sections for the different control arm configuration.

2. The control arm as defined in claim 1 wherein said overlap seam is formed along said one wall a predetermined distances from said apex of said modulus sections facilitating welding of said seam with a single pass weld pattern.

3. The control arm as defined in claim 2 wherein said predetermined distance between said seam and said apex varies along said modulus section in order to maintain said single pass weld pattern.

4. The control arm as defined in claim 3 wherein said predetermined distance between said seam and said apex varies according to the configuration of said integral body in order to maintain said single pass weld pattern between control arms with different body configuration.

5. In a control arm for a vehicle suspension system, said control arm having an integral body with a substantially U-shaped configuration and including a bottom wall and a pair of integral side walls extending upwardly from said bottom wall, means for receiving a ball joint assembly mounted within said bottom wall at a bight of said body and means for receiving a pivot bar assembly at remote ends of each arm of said body, the improvement comprising:

modulus sections along a substantial part of the length of each arm extending from said bight of said body, said bight having a U-shaped cross-sectional configuration with said side walls extending upwardly from said bottom wall and having a hollow, substantially triangular cross-sectional configuration formed of an integral one-piece stamping and including a compound curve along said modulus sections, said triangular modulus sections having a seam formed along one wall thereof in a predetermined pattern along the compound curve of said modulus sections by overlapping one of said side walls of aid stamping over the other of said side walls, said seam formed along said one wall a predetermined distance from an apex of said modulus sections facilitating welding of said seam with a single pass weld pattern for different control arm configurations allowing welding of identical cross-sectional locations along said modulus sections for the different control arm configurations.

6. The control arm as defined in claim 5 wherein said predetermined distance between said seam and said apex varies along said modulus section in order to maintain said single pass weld pattern.

7. The control arm as defined in claim 6 wherein the configuration of said integral body of the control arm varies according to the vehicle suspension system, said predetermined distance between said seam and said apex varying in accordance with the configuration of said body to maintain said single pass weld pattern between control arms with different body configurations.

* * * * *